(12) United States Patent
Mizuta et al.

(10) Patent No.: US 6,584,110 B1
(45) Date of Patent: Jun. 24, 2003

(54) VOICE GATEWAY AND ROUTE SELECTION

(75) Inventors: Yasuhiro Mizuta, Fukuoka (JP); Masami Ohta, Fukuoka (JP); Kazunori Umezaki, Fukuoka (JP); Tomoyuki Uekado, Fukuoka (JP); Yasuo Inoue, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/375,296

(22) Filed: Aug. 16, 1999

(30) Foreign Application Priority Data

Jan. 13, 1999 (JP) .......................... 11-006136

(51) Int. Cl.⁷ ............................................ H04L 12/28
(52) U.S. Cl. ...................................... 370/401; 370/352
(58) Field of Search ............................. 370/352, 353, 370/356, 230, 252, 401, 261, 271, 259, 357, 328, 389; 707/223, 224, 227, 228; 379/111, 112, 133, 220

(56) References Cited

U.S. PATENT DOCUMENTS

| | | | | |
|---|---|---|---|---|
| 6,137,792 A | * | 10/2000 | Jonas | 370/354 |
| 6,185,204 B1 | * | 2/2001 | Voit | 370/352 |
| 6,359,880 B1 | * | 3/2002 | Curry | 370/352 |
| 6,363,065 B1 | * | 3/2002 | Thornton | 370/352 |
| 6,385,193 B1 | * | 5/2002 | Civanlar | 370/352 |
| 6,389,038 B1 | * | 5/2002 | Godlberg | 370/471 |
| 6,404,746 B1 | * | 6/2002 | Cave | 370/262 |
| 6,426,955 B1 | * | 7/2002 | Gossett Dalton, Jr. | 370/401 |
| 6,434,139 B1 | * | 8/2002 | Liu | 370/352 |

FOREIGN PATENT DOCUMENTS

JP          08181718          7/1996

* cited by examiner

Primary Examiner—Ken Vanderpuye
Assistant Examiner—Ricardo M. Pizarro
(74) Attorney, Agent, or Firm—Katten Mucin Zavis Rosenman

(57) ABSTRACT

A voice gateway is used to transmit voice signals through the Internet. Upon receiving a connection request, the gateway calculates an end-to-end delay time and selects a proper route according to the calculated delay time to improve the quality of voice transmission. A gateway (10) on the caller side multicasts a connection request to gateways (20) on the receiver side. Each of the receiver gateways returns a response to the caller gateway. According to the response, the caller gateway calculates a compression/decompression allowance and selects a route that employs a compression rule whose compression or decompression time is shorter than the compression/decompression allowance.

8 Claims, 16 Drawing Sheets

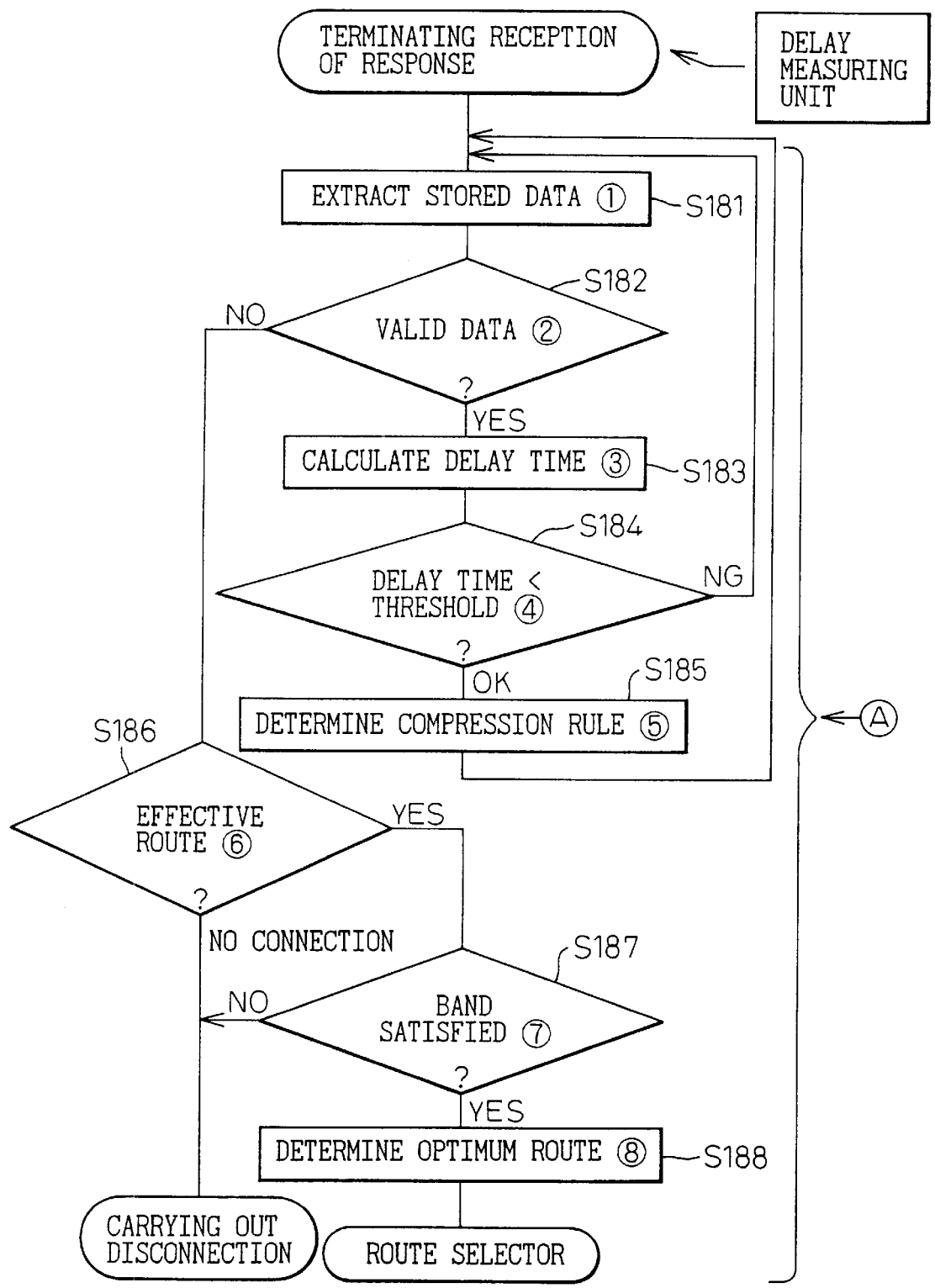

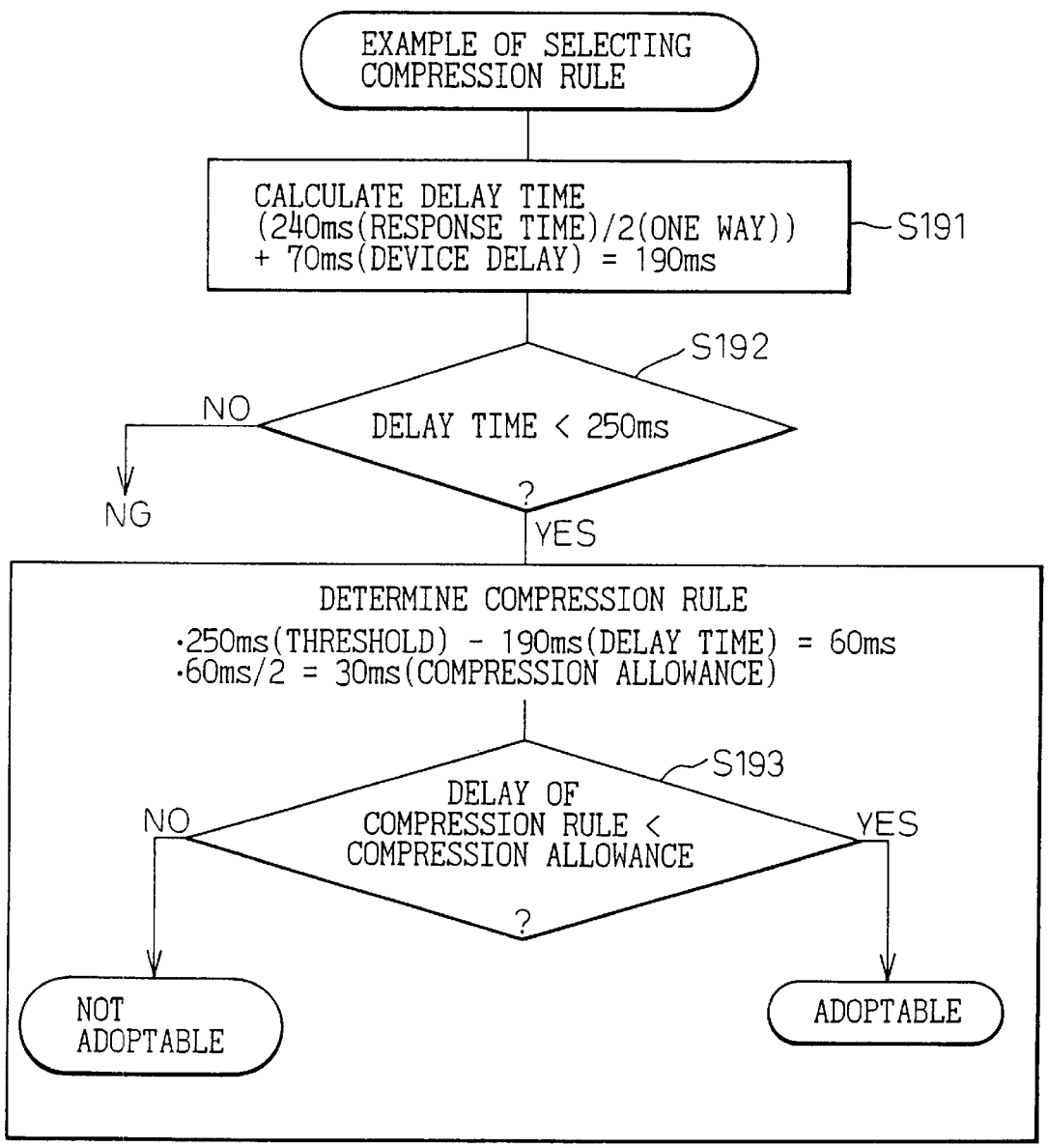

VOICE GATEWAY AND ROUTE SELECTION

BACKGROUND OF THE INVENTION

1. Field of the Invention

The present invention relates to a technique of transmitting voice signals through an IP (internet protocol) network by selecting a route according to an allowable delay time.

2. Description of the Related Art

Conventional voice transmission using a circuit switching network guarantees a bandwidth and a delay time. Voice transmission using an IP network, however, does not guarantee a bandwidth or a maximum delay time, and therefore, causes a problem of the quality of transmitted voice. It is known in the IP network voice transmission that an available bandwidth and a delay time vary depending on the delays in routers and gateways for relaying IP packets and on the congestion in transmission lines. Unlike general data transmission, voice or video transmission allows only a short delay time because voice or video data requires real-time transmission.

FIG. 1 shows static route selection in an internet telephone system. The system includes a gateway 10 serving the caller side to transmit voice, gateway 20 serving the receiver side to receive the voice, a circuit switching network 30, and route selection data 11 used by the gateway 10 on the caller side. A transmission terminal (not shown) makes a call. The call is received by the gateway 10, which relays the call to one of the gateways 20. When relaying the call to a destination telephone, the gateway 10 selects a route according to an IP address related to a destination phone number. At this time, the gateway 10 refers to the route selection data 11 that contains some routes provided with priority. If a route of the first priority is unavailable, the gateway 10 selects a route of the second priority, and so on. For example, the gateway 10 first selects a route (a) of the first priority from the route selection data 11 and relays the call to the gateway 20 as indicated with $\hat{1}$. If a return message from the gateway 20, passed as indicated by $\hat{2}$, indicates that a bandwidth is unavailable, the gateway 10 selects a route (b) of the second priority and relays the call to another gateway 20 as indicated with $\hat{3}$. If a return message from the gateway 20, passed as indicated by $\hat{4}$, indicates that a bandwidth is available, a call connection process will be completed.

Thereafter, the gateways 10 and 20 exchange voice compression rules available for the IP address related to the call, and the gateway 20 selects one of the rules. The selected rule is used between the gateway 10 on the caller side and the gateway 20 on the receiver side to compress and decompress voice data.

This prior art fixes IP addresses and routes for phone numbers in advance, and therefore, is unable to dynamically change routes from one to another. Namely, the prior art is unable to determine a route depending on a change in a delay time in an IP network 50, which will be explained later with reference to FIG. 2.

FIG. 2 shows dynamic route selection in an internet telephone system.

A gatekeeper 40 is provided for gateways 10 and 20. The gateways 10 and 20 periodically inform the gatekeeper 40 of bandwidth data. Upon receiving a call, the gateway 10 refers to the gatekeeper 40 as well as route selection data 11 and determines a route that involves an available bandwidth. Namely, the gateway 10 selects a route depending on dynamic changes in the conditions of the IP network 50.

The gateways 10 and 20 have each an address conversion function and a voice compression-decompression function. The address conversion function is used to relate a phone number in a circuit switching network 30 to an IP address in the IP network 50. The voice compression-decompression function effectively uses the bandwidths of the IP network according to voice compression rules shown. in Table 1.

TABLE 1

| | | Voice compression rules (excerpts from ITU standards) | | | | |
|---|---|---|---|---|---|---|
| | | | Bit rate | | | |
| Bandwidth | | 5/6 Kbps | 8 Kbps | 16 Kbps | 48/56/64 Kbps | >128 Kbps |
| 4 KHz (Tel. quality) | Standard | G.723.1 | G.729 | G.728 | G.711 | |
| | Comp. time | 30 ms | 10 ms | 5 ms | 0.75 ms | |
| 7 KHz | Standard | | | | G.722 | |
| 15 KHz | Standard | | | | | MPEG 1/2 |

Table 1 shows voice compression rules (part) standardized by ITU-T (International Telecommunication Union Telecommunication Standardization Sector). There are voice signal bandwidths of 5/6 Kbps, 8 Kbps, 16 Kbps, 48/56/64 Kbps, and 128 Kbps or over. A compression time becomes longer as the voice signal bandwidth becomes lower. Namely, if a long delay time is allowed, a route that involves a compression rule for a high compression rate can be selected.

FIG. 3 shows voice compression rules according to an H.323 protocol of ITU-T.

For a better understanding of the present invention, the H.323 protocol will be roughly explained. The details of the H.323 protocol are described in the eighth section "Call Signaling Procedures" in pages 45 to 78 of ITU-T H.323 recommendation, September 1997.

The H.323 protocol is a title standard including a plurality of protocols as shown in FIG. 3. These protocols will be explained.

G.711 and G.723.1 are voice encoding protocols.

G.711 relates to PCM (pulse code modulation) and samples voice at 8 KHz to form encoded data of 64 Kbps.

G.723.1 forms encoded data of 5.3.Kbps (ACELP) or 6.3 Kbps (MP-MLQ).

H.261 is a protocol for encoding video data for a videoconference. There are CIF (common interface format) (288× 352) and QCIF (quarter CIF).

H.225.0(RTP) (real time protocol) forms packets from voice and video streams and carries out synchronization based on time stamps.

H.225.0(RTCP) (real time control protocol) controls the RTP.

H.225.0(RAS) is a signal protocol between a terminal and a gatekeeper. According to this signal protocol, the gatekeeper certifies a connection request from the terminal.

H.225.0(Q.931) is a call control signal protocol based on Q.931.

H.245 transfers control signals between terminals. The control signals represent, for example, the performance of the terminals.

Each message has a logic channel and is described in ASN.1 syntax.

FIG. 4 shows basic H.323 protocol phases. Phase A is a call setup, phase B carries out initial communication and capability exchange, phase C establishes audiovisual communication, phase D is a call service, and phase E is a call termination.

a) Phase A: Setup

FIG. 5 shows call control messages based on H.225.0 exchanged between end points 1 and 2 in the call setup of the phase A. The end point 1 transmits a message with an IP address to the end point 2. The end point 2 returns a call proc. message, an alert message, or a connect message each containing an H.245 control channel address used for H.245 signaling to the end point 1. Then, the phase A ends.

b) Phase B: Initial Communication and Capability

The phase B sets an H.245 control channel. The H.245 control channel is used to open a media channel and exchange transmission capabilities between the end points 1 and 2. As an option, the end point 2 on the receiver side may set an H.245 control channel when receiving a setup message, or the end point 1 on the caller side may set an H.245 control channel when receiving the alerting or call proc. message. Basic messages will be explained.

An H.245 TerminalCapabilitySet message is used to exchange capabilities between terminals.

An H.245 MasterSlaveDetermination message is used to determine a master between two terminals according to a random number.

According to the H.323 protocol, a caller terminal sends a TerminalCapabilitySet message to a receiver terminal to inform the receiver terminal of a terminal capability. If the terminal capability is acceptable, the receiver terminal returns a TerminalCapabilityAck message to the caller terminal. The exchange of terminal capabilities may be carried out any time. For this purpose, a TCP channel for an H.245 control channel must be set in advance.

c) Phase C: Establishment of Audiovisual Communication

The phase C sets logic channels for various pieces of data after the transmission capability exchange and master/slave determination. Voice and video data are transmitted according to a TSAP ID (transport layer service access point ID, i.e., a UDP port number) by using the channel set in the H.245 setup phase. The attributes of the channels can be changed during communication as follows:

(1) Mode change

The structure, capability, reception mode, etc., of a channel are changeable.

(2) Media stream address distribution

There are messages used to transmit addresses for setting logic channels between terminals. These messages will be explained.

An H.245 openLogicalChannel message carries a caller logical channel number and a channel setting request.

An H.245 openLogicalChannelAck message carries a receiver logical channel number.

d) Phase D: Call Service

The phase D provides bandwidth change and status services. These services will be explained.

i) Bandwidth change

A bandwidth is changeable according to a request from an H.323 terminal. There are sequences for a channel change on the caller side and a channel change on the receiver side. The destination of the request is a gatekeeper.

An H.225.0 BRQ (bandwidth change request) message is used to make a request to a gatekeeper for a bandwidth change.

An H.225.0 BRJ (bandwidth change reject) message is used by the gatekeeper to reject the bandwidth change request.

An H.225.0 BCF (bandwidth change confirm) message is used by the gatekeeper to accept the bandwidth change request.

An H.245 CloseLogicalChannel message is used to discard a logic channel before a bandwidth change.

An H.245 OpenLogicalChannel message is used to set a logic channel of a requested bandwidth.

An H.245 OpenLogicalChannelAck message is used to inform of a result of resetting a logic channel.

An H.245 FlowControlCommand message is used to make a receiver set a logic channel whose bandwidth is changed.

ii) Status

There are messages used by a gatekeeper to monitor the operating states and failures of terminals.

An H.225.0 information request message is used by a gatekeeper to request the statuses of terminals.

An H.225.0 information request response message is used to return the bandwidth and type of a terminal in response to a request from a gatekeeper.

e) Phase E: Call Termination

The phase E is a call termination sequence. It closes video, data, and voice channels in this order. If there is a gatekeeper, a caller uses an H.245 EndSessionCommand message. If there is no gatekeeper, an H.225 release complete message is transmitted to terminate a call.

As explained above, the longer a delay time, the lower the quality of the transmitted voice. The present invention finds an end-to-end delay time and, according to the delay time, selects a proper route to improve the quality of voice to be transmitted.

FIG. 6 shows an end-to-end delay time in an internet telephone system. The delay time mainly consists of a network delay time, a device delay time, and a voice compression or decompression delay time. The total of the three delay times is a total delay time or an end-to-end delay time. A route A involves a total delay time that exceeds an allowable delay time, and therefore, is not selectable as a route for transmitting voice. A route B involves a compression or decompression delay time that is shorter than that of the route A and a total delay time that is within the allowable delay time. Accordingly, the route B can be used as a route for transmitting voice. A route that has a total delay time within the allowable delay time can be found by calculating the total delay time according to a voice compression rule employed by the route.

The gatekeeper 40 of FIG. 2 receives bandwidth data from each of the gateways 10 and 20 at regular intervals. The collecting the bandwidth data at regular intervals, however, is not in real time. As a result, data used by the gatekeeper 40 to handle a connection request deviates from actual data. For example, a bandwidth that seems to be available may actually be unavailable. When selecting a route, the prior art of FIG. 2 only compares a bandwidth required for transmitting compressed voice with available bandwidths. Namely, the prior art pays no attention to an end-to-end delay including compression and decompression delays. As a result, the end-to-end delay sometimes exceeds an allowable delay set for a call. In this case, even if the call is successfully connected, voice packets related to the call will be intermittently discarded due to the delay exceeding the allowable delay time, to deteriorate the quality of the transmitted voice.

SUMMARY OF THE INVENTION

An object of the present invention is to provide a gateway having a function of measuring a total delay time, selecting a voice compression rule accordingly, and selecting a route accordingly. In the following explanation, "compression/decompression allowance" means an allowable compression or decompression time.

In order to accomplish the object, a first aspect of the present invention provides a method of selecting a route for transmitting voice through gateways connected to the Internet. The method includes the steps of multicasting a connection request from a caller gateway to receiver gateways along routes that run through the caller and receiver gateways, receiving at the caller gateway responses to the connection request from the receiver gateways, calculating, at the caller gateway, a compression/decompression allowance of each of the receiver gateways according to the responses, and selecting one of the routes that employs a compression rule whose compression or decompression time is shorter than the compression/decompression allowance of the corresponding receiver gateway.

Based on the method of the first aspect, a second aspect of the present invention includes the steps of finding a network delay time and a device delay time of each of the receiver gateways according to the responses, calculating the sum of the network delay time and device delay time of each receiver gateway, and calculating the compression/decompression allowance of each receiver gateway by subtracting the calculated sum from a preset allowable delay time.

Based on the method of the first and second aspects, a third aspect of the present invention includes the step of selecting one of the routes that employs a compression rule whose compression or decompression time is shorter than the corresponding compression/decompression allowance and provides the best transmission quality.

Based on the method of the first to third aspects, a fourth aspect of the present invention includes the steps of calculating a maximum delay time of each of the routes according to the responses and not carrying out a connection if none of the maximum delay times is below a threshold.

A fifth aspect of the present invention provides a gateway apparatus for transmitting voice through an IP network. The apparatus has a unit for multicasting a connection request to receiver gateways along routes running through the receiver gateways, a unit for receiving responses to the connection request from the receiver gateways, a unit for finding a network delay time and a device delay time of each of the receiver gateways according to the responses, calculating the sum of the network delay time and device delay time of each receiver gateway, and calculating a compression or decompression time of each receiver gateway by subtracting the calculated sum from a preset allowable delay time, and a unit for selecting one of the routes that employs a compression rule whose compression or decompression time is shorter than the calculated compression or decompression time of the corresponding receiver gateway.

Based on the gateway apparatus of the fifth aspect, a sixth aspect of the present invention does not carry out a connection if there is no receiver gateway whose sum of the network delay time, device delay time, and compression or decompression time is below a threshold.

Based on the gateway apparatus of the fifth and sixth aspects, a seventh aspect of the present invention selects a route that employs a compression rule whose compression or decompression time is shorter than the compression or decompression time of the corresponding receiver gateway and provides the best transmission quality.

The ITU-T does not clearly standardize individual processing times of compression and decompression, and therefore, the present invention considers that the compression and decompression times are substantially equal to each other. If they differ from each other, a longer one is employed as a compression or decompression time. Consequently, there are a network delay time, a device delay time, and a compression or decompression delay time as shown in FIG. 6.

With these methods and apparatuses, the present invention solves the problems of the prior arts.

BRIEF DESCRIPTION OF THE DRAWINGS

The present invention will be more clearly understood from the description as set forth below with reference to the accompanying drawings, in which:

FIGS. 17A and 17B show flows of selecting an optimum route according to the embodiment;

FIG. 18 shows a flow of selecting a compression rule according to the embodiment.

DESCRIPTION OF THE PREFERRED EMBODIMENTS

Figure 7:
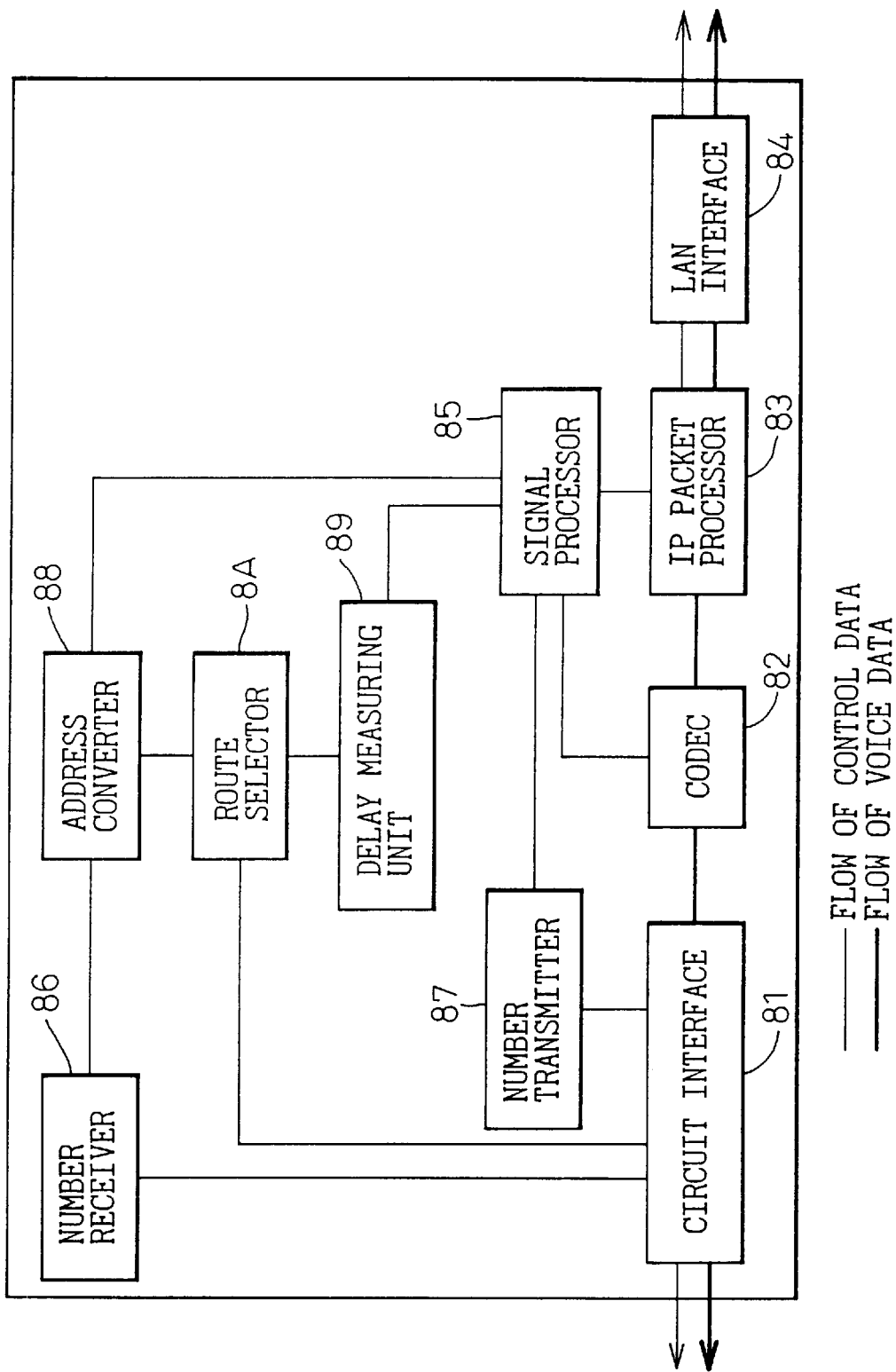
FIG. 7 shows the principle of a gateway according to the present invention.

The principle of a gateway according to the present invention will be explained with reference to FIG. 7.

<Outlines of Structure and Parts>

Components of the gateway of the present invention will be explained.

A circuit interface 81 connects a circuit switching network 30 and an IP network 50 to each other, processes transmission and reception signals, and transmits and receives voice signals.

An encoding, compressing, and decompressing unit 82 (hereinafter referred to as the codec 82) encodes and compresses a voice signal from the circuit interface 81 according to a specified compression rule and provides an IP packet processor 83 with the compressed voice signal. Also, the codec 82 decompresses a compressed voice signal from the IP packet processor 83 and provides the circuit interface 81 with the decompressed voice signal.

The IP packet processor 83 extracts data from IP packets transferred from a LAN interface 84. If the extracted data is a voice signal, the IP packet processor 83 transfers the voice signal to the codec 82, and if it is a control signal, the IP packet processor 83 transfers the control signal to a signal processor 85. The IP packet processor 83 packs data from the codec 82 or signal processor 85 into IP packets and transfers the IP packets to the LAN interface 84.

The LAN interface 84 transmits and receives IP packets to and from the IP network 50.

Figure 1:
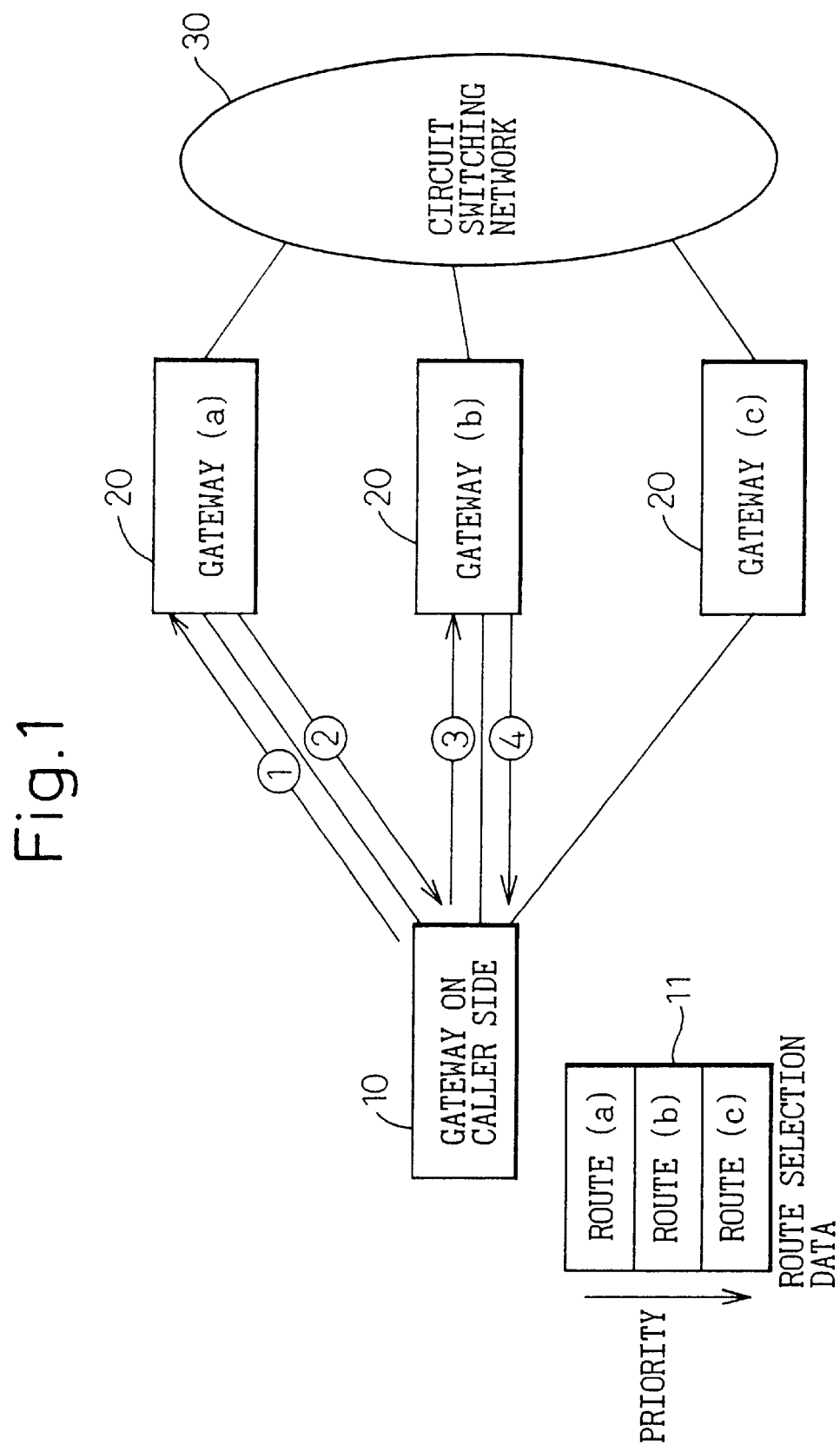
FIG. 1 shows static route selection in an internet telephone system.
Figure 2:
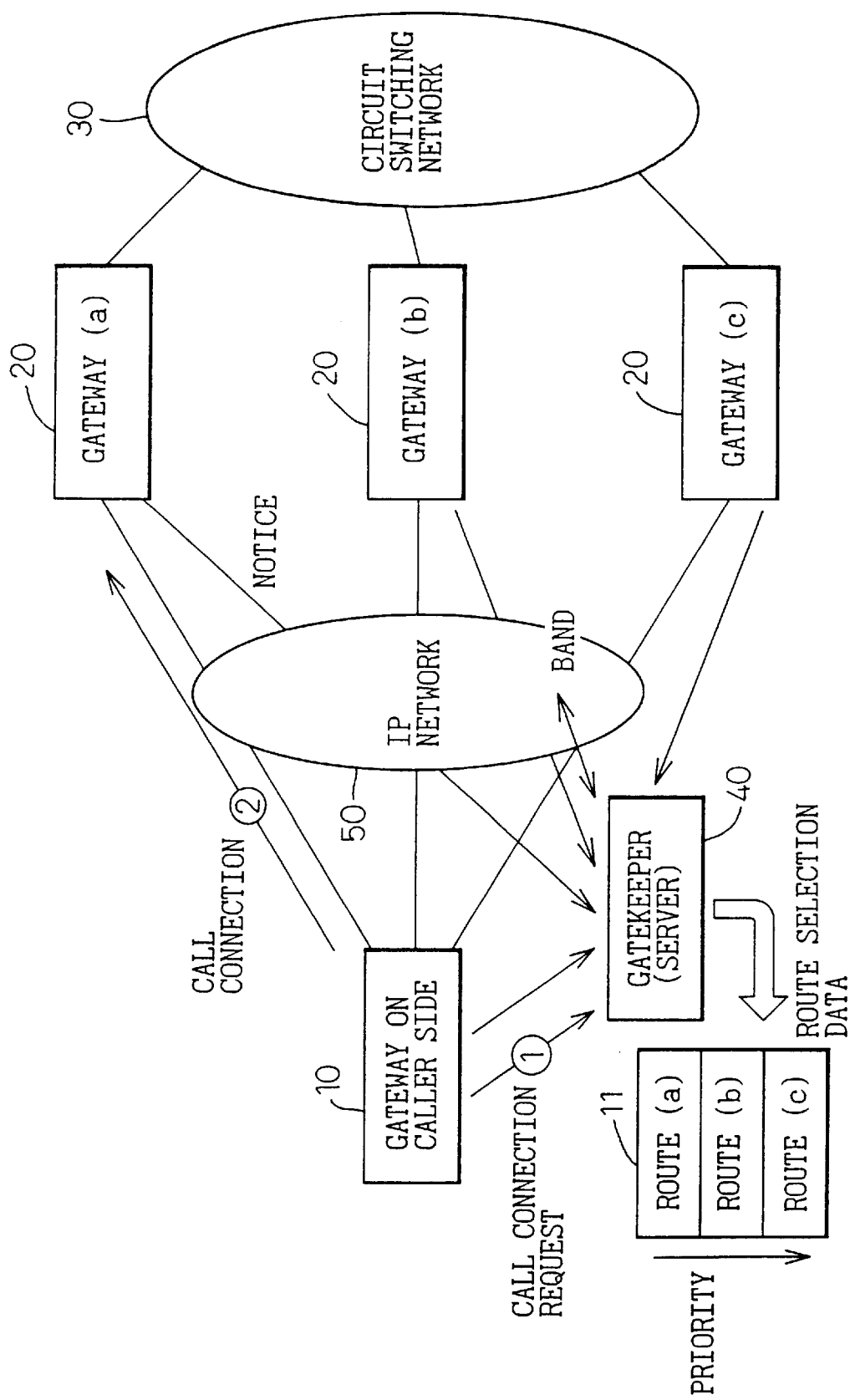
FIG. 2 shows dynamic route selection in an internet telephone system.
Figure 3:
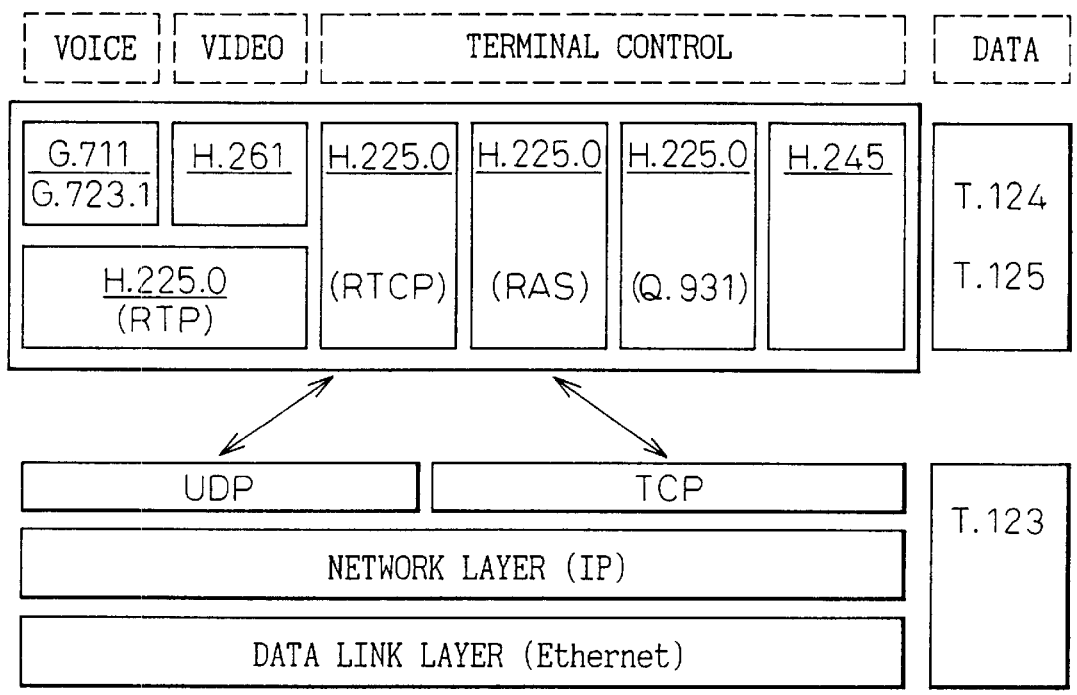
FIG. 3 shows voice compression rules according to H.323 protocol of ITU-T.
Figure 4:
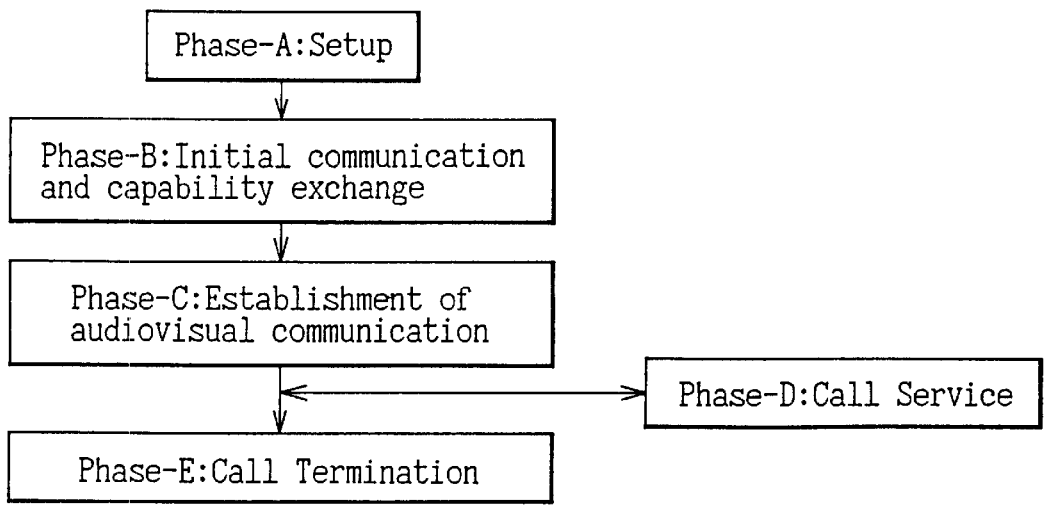
FIG. 4 shows basic H.323 protocol phases.
Figure 5:
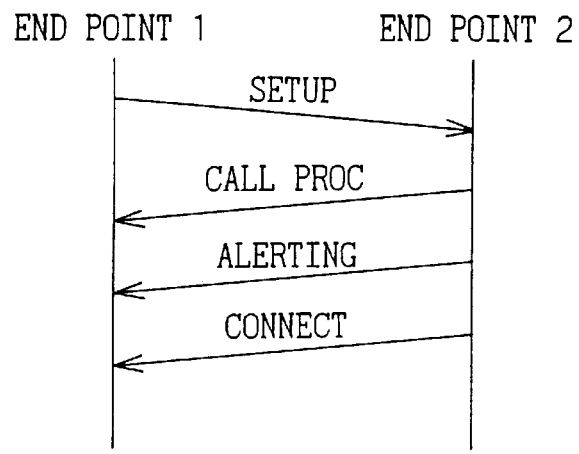
FIG. 5 shows a call setup in phase A of FIG. 4.
Figure 6:
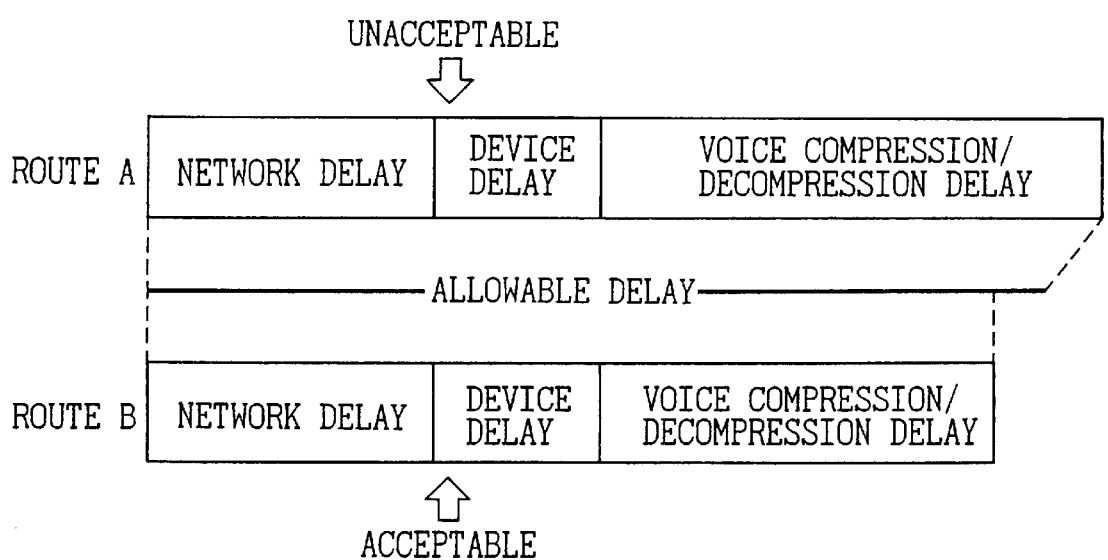
FIG. 6 shows an end-to-end delay time in an internet telephone system.

The signal processor 85 analyzes and assembles control signals communicated between the gateways of FIGS. 1 and 2. On the receiver side, the signal processor 85 prepares a response, which contains voice compression rules and a device delay time, to a connection request and returns the response to a caller.

A number receiver 86 receives and holds a destination phone number transferred from the circuit switching network 30 through the circuit interface 81.

A number transmitter 87 transmits a phone number to a receiver connected to the circuit switching network 30 through the circuit interface 81.

An address converter 88 has phone numbers and corresponding IP addresses or multicast IP addresses. Upon receiving a phone number through the circuit interface 81, the address converter 88 retrieves a corresponding IP address.

A delay measuring unit 89 measures a response delay time on a control signal transmitted to a multicast IP address. The measured response delay time is stored according to a destination IP address. After a given measuring period, the delay measuring unit 89 asks a route selector 8A to determine an optimum route. The delay measuring unit 89 may hold a previous network delay time, calculate an average of the previous and present network delay times, and use the average as a new network delay time.

The route selector 8A calculates, for each receiver gateway, the sum of the delay time measured by the delay measuring unit 89, a device delay time of the receiver gateway, and a delay time related to a compression rule employed by a route running through the receiver gateway, compares the sum with an allowable delay time, and determines whether or not the route is adoptable.

<Principle of Operation>

A process of handling a call by the caller gateway 10 will be explained with reference to FIGS. 1 and 7.

The caller gateway 10 receives the call from a subscriber terminal. The circuit interface 81 picks up a phone number from the call digit by digit, and the phone number digits are transferred to the number receiver 86. The number receiver 86 determines the number of digits to receive. The number of digits of a phone number depends on a destination. For example, toll-free telephones and police stations have fixed numbers of digits. The number receiver 86 stores the phone number up to a determined number of digits. The number receiver 86 transfers the phone number to the address converter 88, which converts the phone number into a multicast IP address and transfers the multicast IP address and phone number to the signal processor 85.

The signal processor 85 edits the phone number as additional data to a connection request message to be sent to the multicast IP address. The signal processor 85 transfers the additional data to the IP packet processor 83 and asks the delay measuring unit 89 to measure a response delay time of each of the gateways 20 identified by the multicast IP address. The delay measuring unit 89 starts to measure a delay time for each of the gateways for a predetermined period. Namely, the caller gateway 10 measures a time between the transmission of a connection request and the reception of a response to it and measure a delay time in a corresponding route.

Upon receiving the connection request message, the IP packet processor 83 prepares IP packets accordingly and transfers the packets to the LAN interface 84. The LAN interface 84 transmits the IP packets to the gateways 20 according to the multicast IP address.

The operation of one of the gateways 20 that receive the connection request message from the caller gateway 10 will be explained. The LAN interface 84 of the gateway 20 receives the message and transfers it to the signal processor 85 through the IP packet processor 83. The signal processor 85 extracts the phone number from the message and transfers the phone number to a corresponding circuit through the number transmitter 87 and circuit interface 81. The signal processor 85 prepares a response message containing voice compression rules and a device delay time of the gateway 20 and transmits the response to the caller gateway 10 through the IP packet processor 83 and LAN interface 84. The caller gateway 10 receives the response, calculates a delay time according to the device delay time and voice compression rule of each receiver gateway 20.

The response message is received by the delay measuring unit 89 through the LAN interface 84, IP packet processor 83, and signal processor 85 of the gateway 10. The delay measuring unit 89 keeps, for each of the routes, i.e., for each of the IP addresses of the receiver gateways, the measured delay time and the compression rules and device delay time contained in the response message.

A given time after the transmission of the connection request, the route selector 8A compares the sum of the delay time of a route, a delay time produced by a compression rule of the route, and a device delay time related to the route with a threshold 201 (FIG. 19) corresponding to a maximum delay time. More precisely, the route selector 8A selects a route that involves a compression rule that ensures a high voice quality and a delay time that is below the threshold and informs the signal processor 85 of the selected route. As a result, a connection for the call is started according to a compression rule of the codec 82 and the selected route. In this way, the present invention selects for a given call an available route that involves a voice compression rule having a low compression rate, i.e., a good voice quality.

<Embodiment>

An embodiment according to the present invention will be explained. Values and the sizes of tables shown in the accompanying drawings are only examples and do not limit the present invention.

Figure 8:
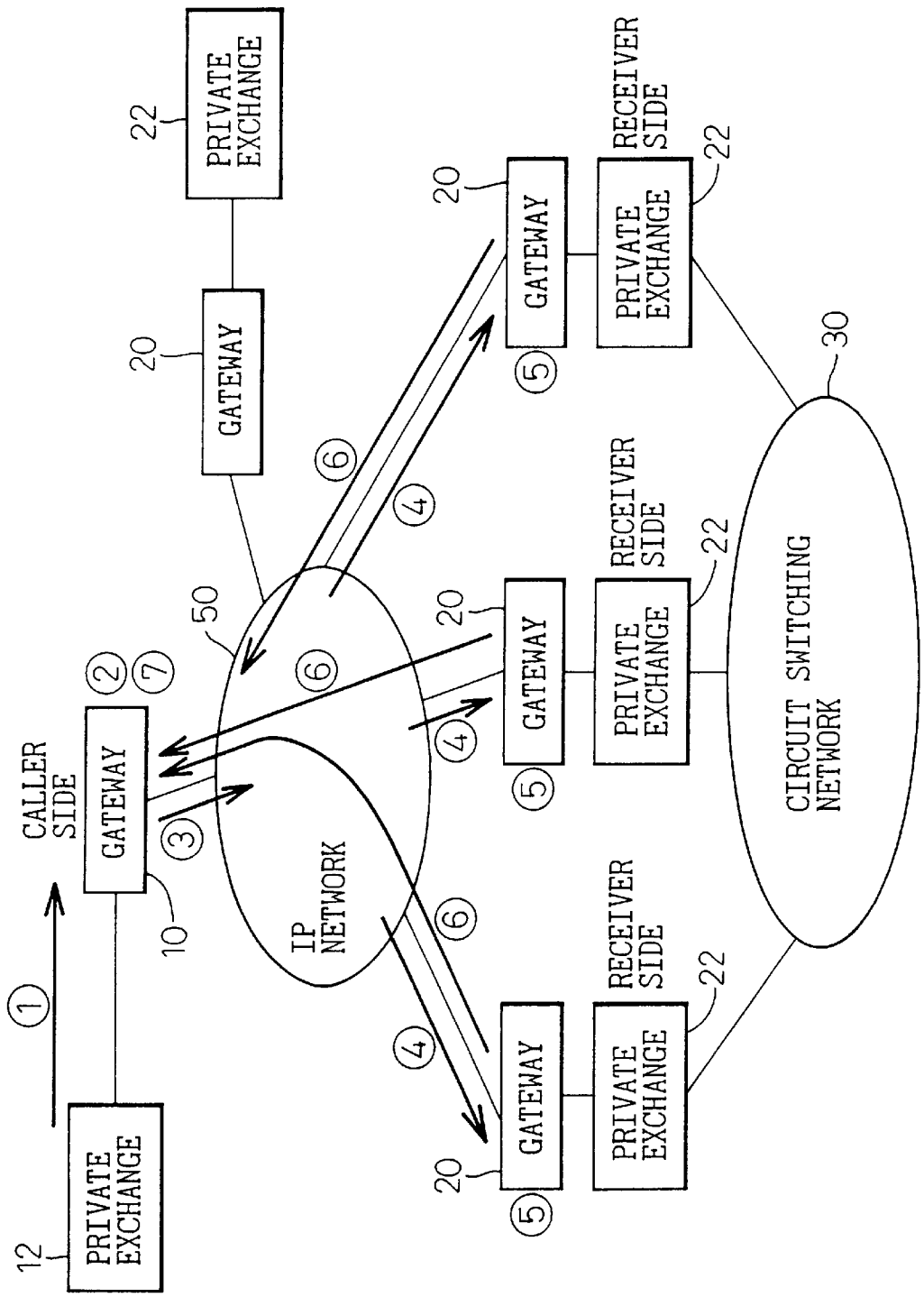
FIG. 8 shows a network according to an embodiment of the present invention.
Figure 9:
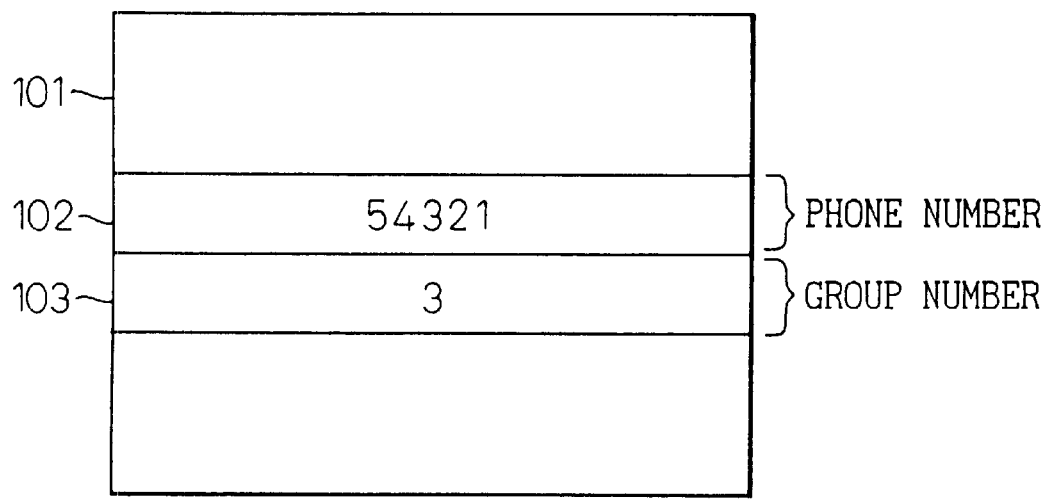
FIGS. 9 and 10 show address conversion data according to the embodiment.
Figure 10:
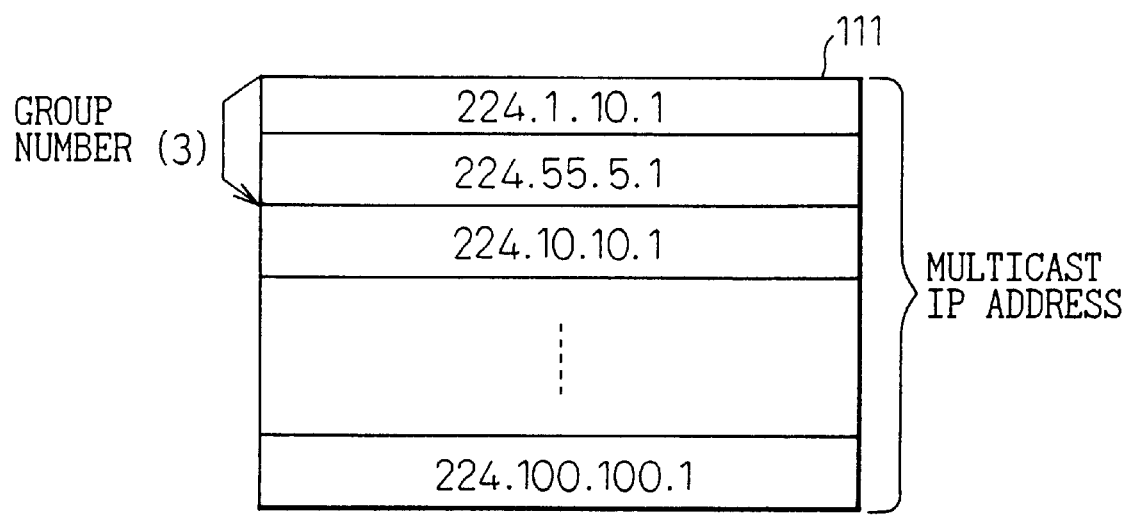
Figure 11:
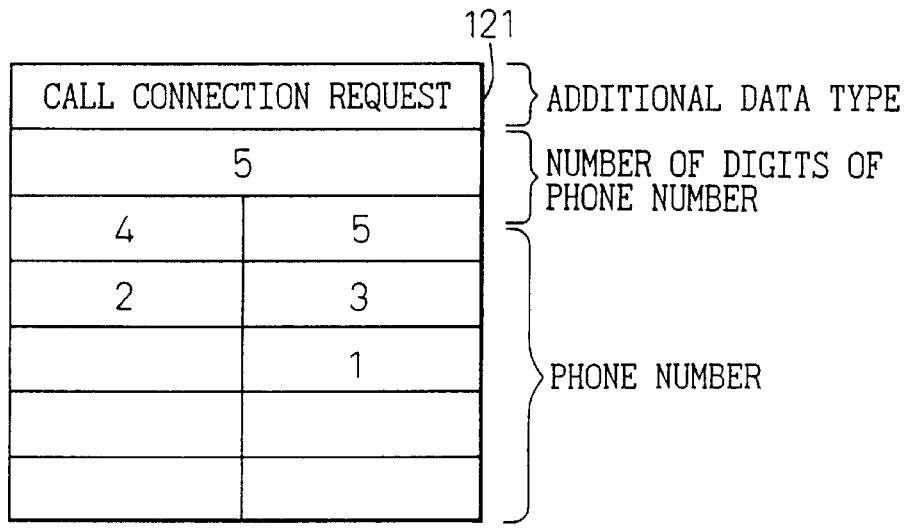
FIG. 11 shows additional data to be added to a connection request according to the embodiment.
Figure 12:
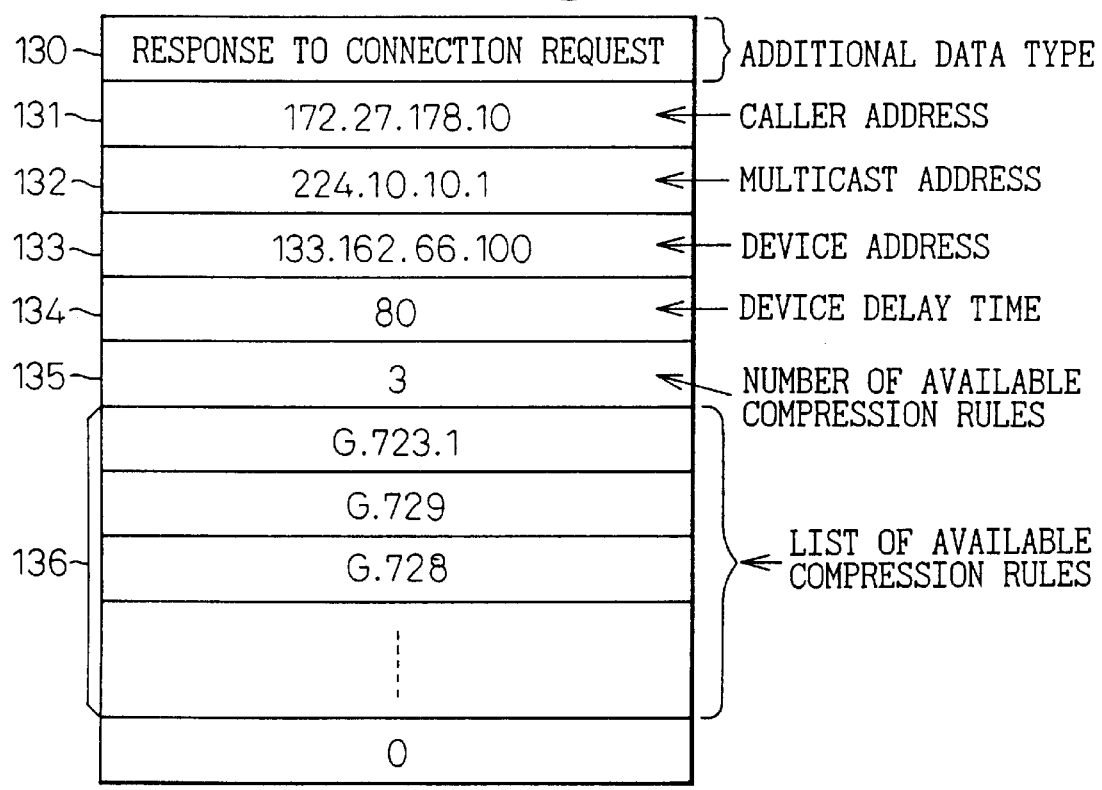
FIG. 12 shows additional data to be added to a response according to the embodiment.

FIG. 8 shows a network having a private exchange 12 and gateways 10 and 20. FIGS. 9 and 10 show address conversion data used to find a group number from a phone number and a multicast IP address from the group number. FIG. 11 shows additional data to be added to a connection request, and FIG. 12 shows additional data to be added to a response to the connection request.

The exchange 12 makes a call to a circuit switching network 30 as indicated with 1̂. The call is received by the caller gateway 10. The call contains a destination phone number of, for example, 54321.

The gateway 10 carries out internal processes as indicated with 2̂. The gateway 10 measures a response delay time of each gateway 20 by multicasting a connection request with IP packets to the gateways 20.

Figure 14:
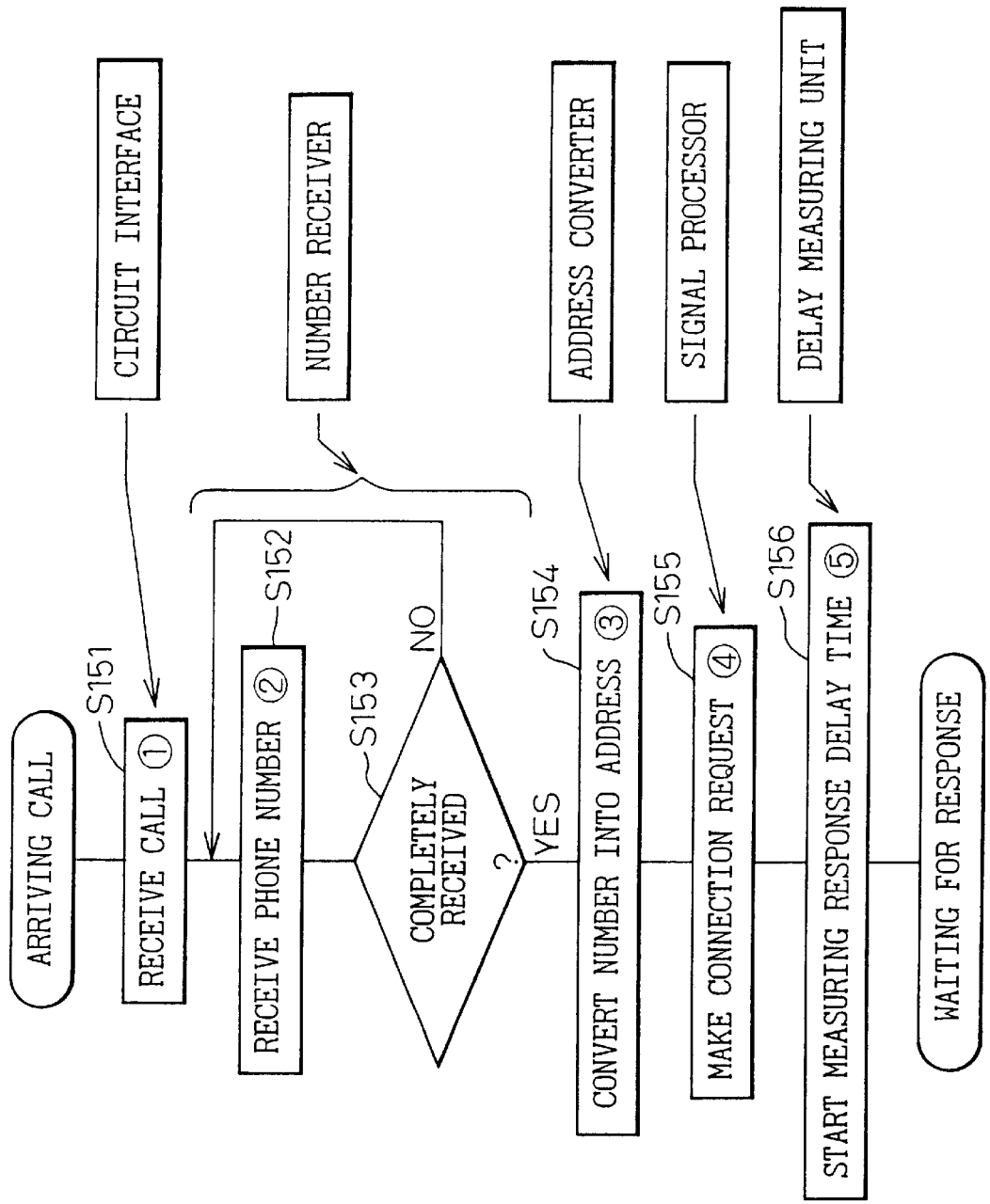
FIG. 14 shows a flow of transmitting a connection request according to the embodiment.

The details of the internal processes of the gateway 10 will be explained with reference to FIG. 14.

In step S151, the circuit interface 81 receives the phone number sent from the private exchange 12 and transfers the same to the number receiver 86.

In step S152, the number receiver 86 examines the phone number, determines that the phone number is of five digits, and stores the five digits.

In step S153, the number receiver 86 transfers the phone number to the address converter 88, and the flow goes to step S154. If the phone number is not stored yet in step S153, the flow returns to step S152.

In step S154, the address converter 88 retrieves a group number corresponding to the phone number "54321" from address conversion data 101 of FIG. 9. In this example, the phone number "54321" is found in a numerical string field 102, and therefore, the address converter 88 retrieves a group number of 3 from a group number field 103. The group number of 3 is used as an index to retrieve a multicast IP address from address conversion data 111 of FIG. 10. In this example, a multicast IP address of 224.10.10.1 is retrieved from the third field corresponding to the group number of 3. The phone number "54321," the number of digits of 5 of the phone number, and the group number of 3 are transferred to the signal processor 85.

In step S155, the signal processor 85 edits additional data 121 of FIG. 11 to be added to a connection request message and informs the IP packet processor 83 of the multicast IP address of 224.10.10.1.

In step S156, the delay measuring unit 89 is requested to measure a response delay time of each gateway 20 identified by the multicast IP address of 224.10.10.1. The IP packet processor 83 prepares IP packets for the multicast IP address, requests the LAN interface 84 to multicast the IP packets, and waits for responses.

Returning to FIG. 8, the caller gateway 10 thus multicasts the IP packets containing the connection request to the IP network 50 as indicated with $\hat{3}$.

The multicast IP packets are received by the target gateways 20 as indicated with $\hat{4}$.

Each of the target gateways 20 carries out internal processes as indicated with $\hat{5}$. Each gateway 20 returns a response to the received IP packets.

Figure 15:
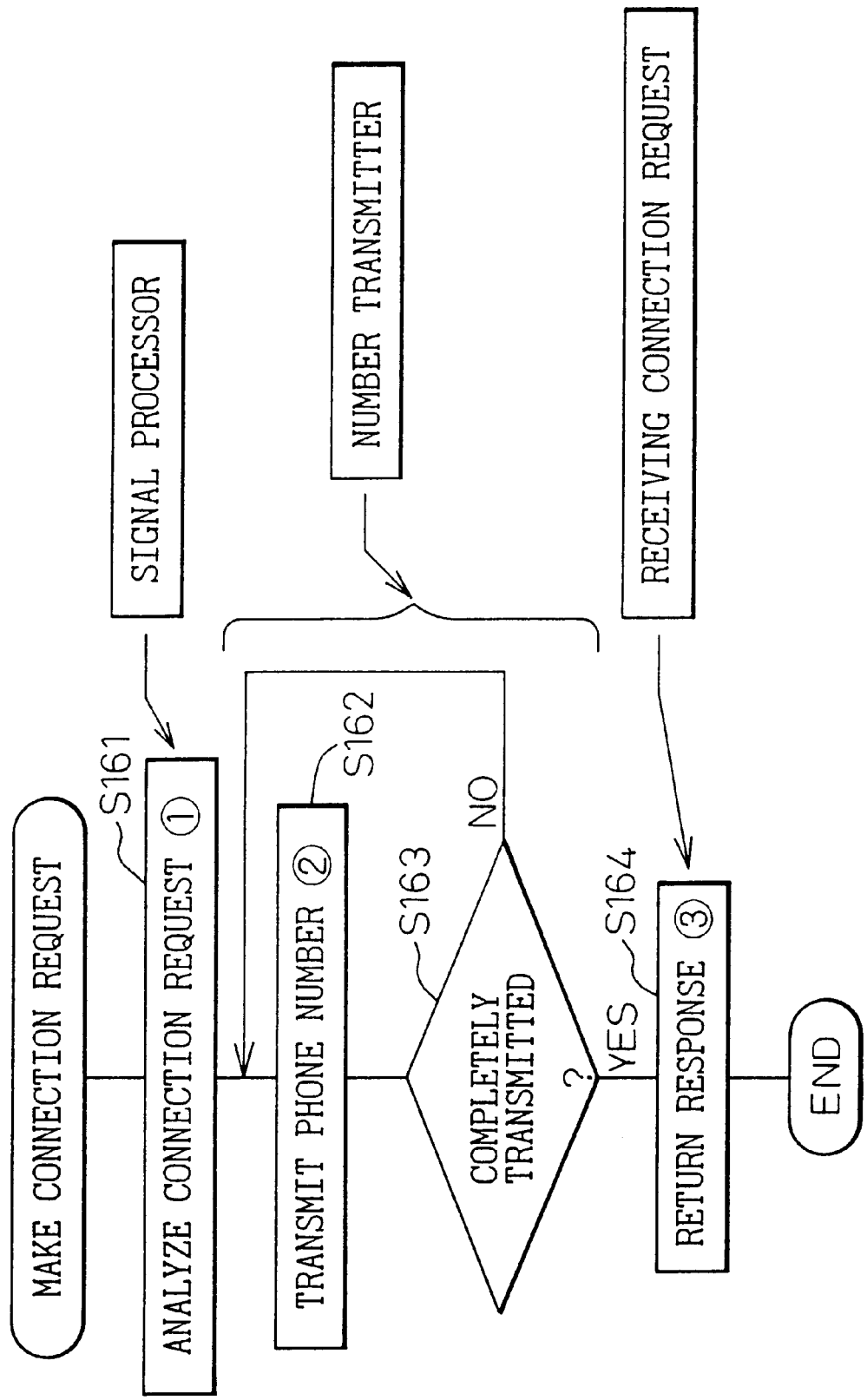
FIG. 15 shows a flow of returning a response to the connection request according to the embodiment.

The details of the processes carried out by each gateway 20 that has received the IP packets will be explained with reference to FIG. 15.

In step S161, the LAN interface 84 of the gateway 20 receives the IP packets and transfers the address data and additional data contained in the IP packets to the signal processor 85. The signal processor 85 extracts the phone number "54321" out of the additional data and transfers it to the number transmitter 87.

In step S162, the number transmitter 87 determines that the number of digits of the phone number is five and stores the five digits.

Step S163 checks to see if the phone number digits have been stored. If they are stored, the flow goes to step S164, and if not, the flow returns to step S162.

Each receiver gateway 20 returns IP packets serving as a response to the caller gateway 10 as indicated with $\hat{6}$ in FIG. 8.

Namely, in step S164, the signal processor 85 of the receiver gateway 20 prepares additional data 130 of FIG. 12 to be added to the response to the connection request. A caller address of 172.27.178.10 is set in a field 131, the multicast IP address of 224.10.10.1 is set in a field 132, a receiver IP address of 133.162.66.100 is set in a field 133, a device delay time of 80 milliseconds of the receiver gateway 20 is set in a field 134, the number of available voice compression rules of 3 is set in a field 135, and a list of available voice compression rules of G.723.1, G.729, and G.728 is set in a field 136. The response message is packed in IP packets, which are returned to the caller gateway 10 through the IP packet processor 83 and LAN interface 84.

The caller gateway 10 receives the response as indicated with $\hat{7}$ in FIG. 8. According to the delay time contained in the response, the gateway 10 selects a proper route.

The details of this will be explained with reference to FIG. 16.

In step S171, the signal processor 85 receives the response through the LAN interface 84 and IP packet processor 83 and transfers the additional data contained in the response to the delay measuring unit 89.

In step S172, the delay measuring unit 89 extracts the multicast IP address of 224.10.10.1 from the additional data and determines whether or not the response has been arrived within the measuring period and whether or not the list of compression rules contains one that can be used by the caller gateway 10. Namely, step S172 determines whether or not the response is valid.

If the response is valid, step S173 uses the multicast IP address of 224.10.10.1 to retrieve the group number of 3 from the address conversion data of FIG. 10. If the response is invalid, the flow goes to step S175.

Figure 13:
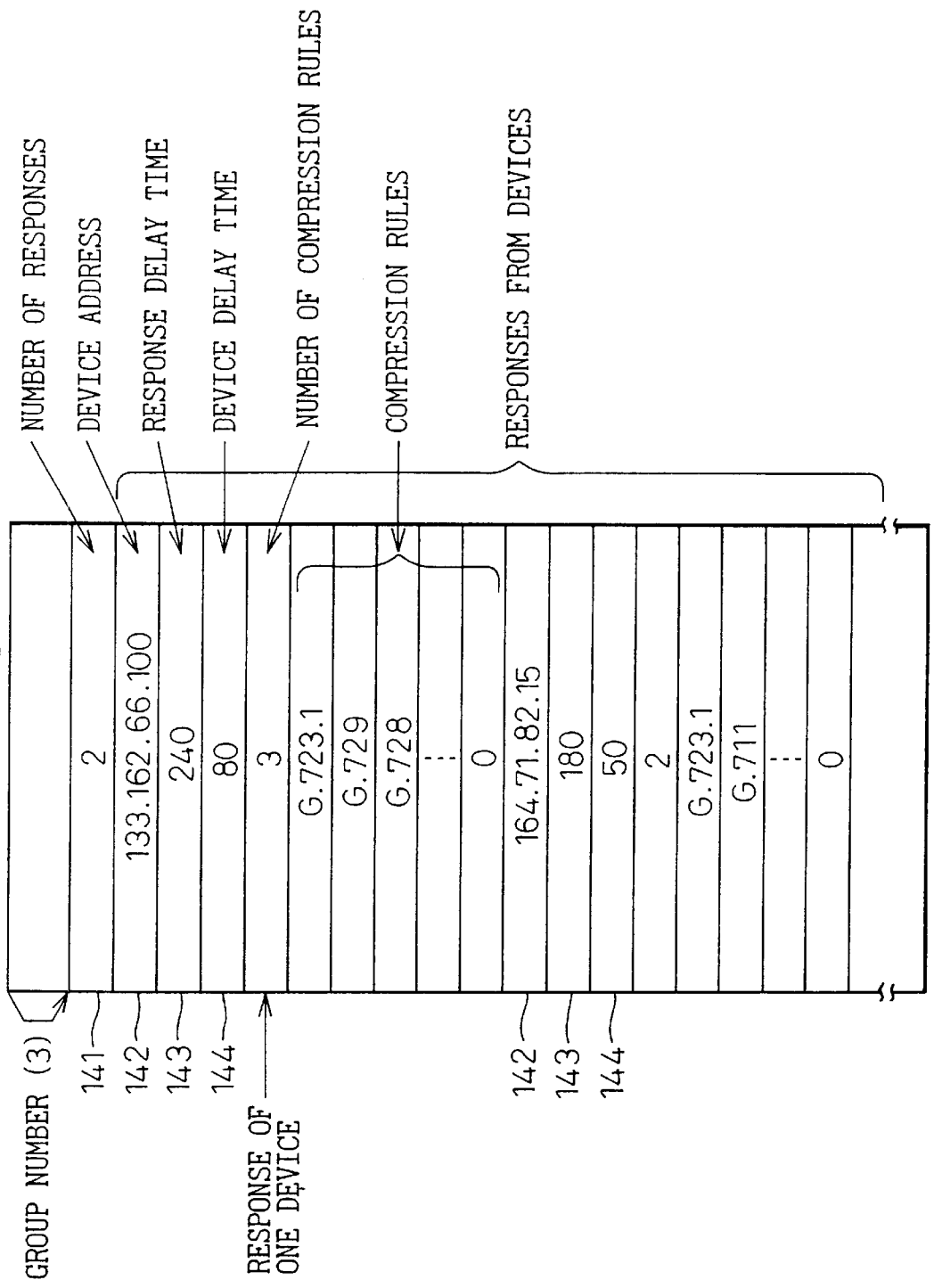
FIG. 13 shows data about responses sent from receiver gateways according to the embodiment.

FIG. 13 shows data about responses sent from the receiver gateways 20. A technique of extracting data from a response from a receiver gateway according to a group number of, for example, 3 will be explained with reference to FIGS. 13 and 16.

Step S174 extracts voice compression rules from data fields specified by the group number of 3 and stores them. At the same time, a response delay time is stored. In FIG. 13, a field 141 stores the total number 2 of responses returned by the gateways 20. A field 142 stores an IP address of 133.162.66.100 of a first one of the gateways 20 that have returned the responses, and another field 142 stores an IP address of 164.71.82.15 of a second gateway 20. Fields 143 store response delay times of 240 milliseconds and 180 milliseconds of the first and second gateways 20, respectively. Fields 144 store device delay times of 80 milliseconds and 50 milliseconds of the first and second gateways 20, respectively. Fields 145 store the numbers 3 and 2 of voice compression rules of the first and second gateways 20, respectively. Fields 146 store the types of ITU-T voice compression rules G.723.1, G.729, and G.728 for the first gateway 20 and G.723.1 and G.711 for the second gateway 20.

Step S175 waits for another response.

Figure 19:
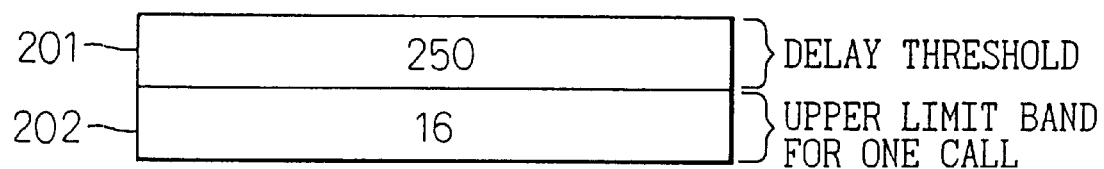
FIG. 19 shows system data of a gateway according to the embodiment.

Returning to FIG. 8, a total delay time is calculated from the response of each gateways 20, a compression rule that satisfies the specified threshold 201 of FIG. 19 is determined, whether or not the connection request is acceptable is determined, and an optimum route is determined as indicated with $\hat{8}$.

Figure 17B:
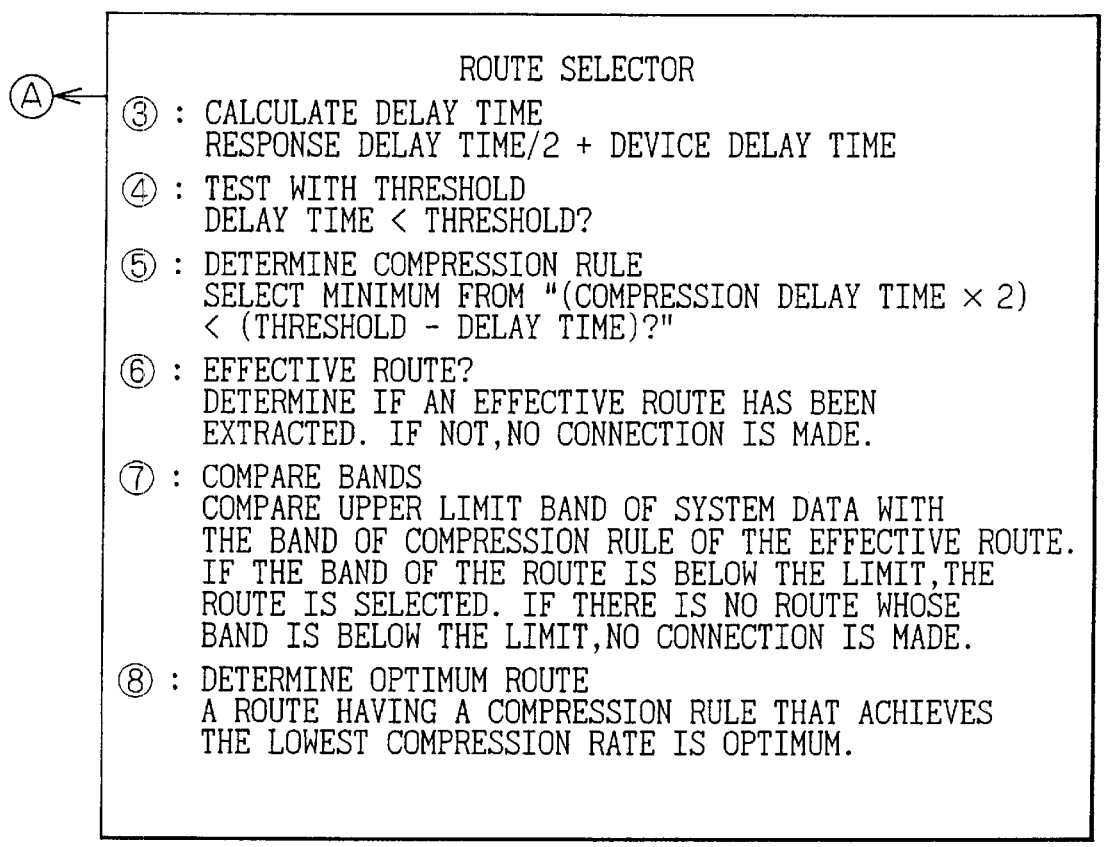

The details of these operations will be explained with reference to FIGS. 17A and 17B.

Figure 16:
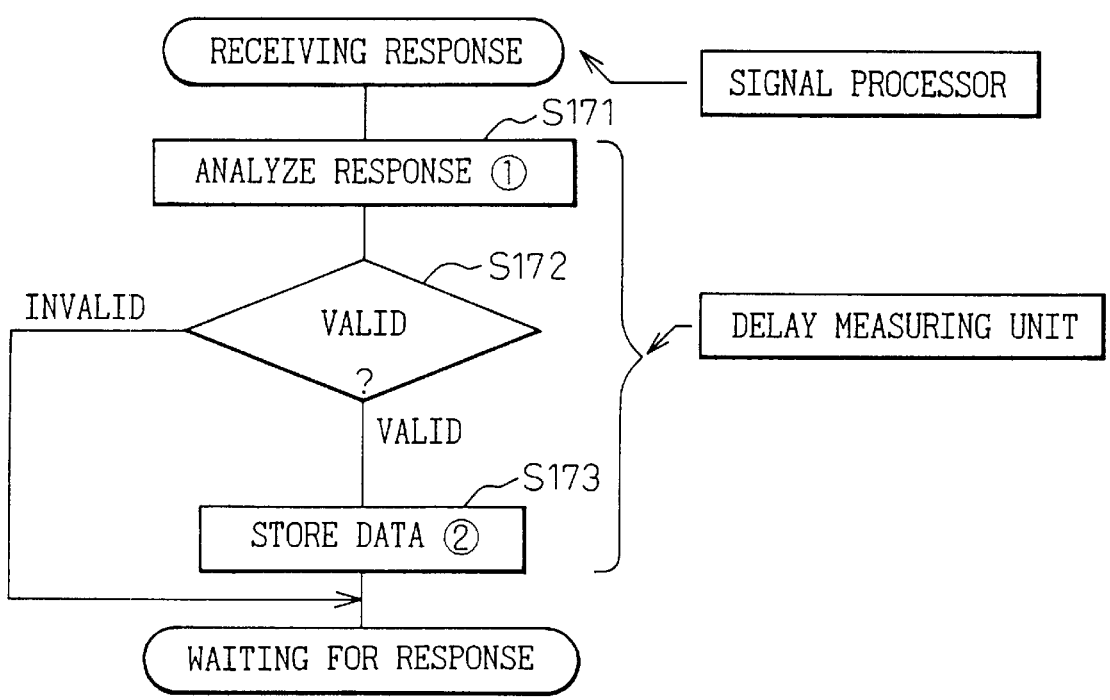
FIG. 16 shows a flow of analyzing the response according to the embodiment.

Step S181 takes out the response delay times stored in step S174 of FIG. 16.

If there is no valid response, step S182 branches to step S186. If there is a valid response, step S182 sets a status that there is at least one valid response and branches to step S183.

Step S183 calculates a delay time by transferring the response delay time taken out in step S181 to the delay measuring unit 89.

In step S184, the delay measuring unit 89 determines whether or not the response delay time is within the threshold. If it is within the threshold, the group number of 3 is transferred to the route selector 8A. The route selector 8A uses the group number of 3 to retrieve data for each route (each receiver gateway 20) corresponding to the group number 3 from the data of FIG. 13. Among the retrieved data, the first device (route) has a response delay time of 240 milliseconds, which is halved to calculate a compression or decompression time because it is assumed that the compression and decompression times are equal to each other. The halved value of 120 milliseconds is added to a device delay time of 80 milliseconds, to provide a total delay time of 200 milliseconds. This value of 200 milliseconds is compared with the threshold of 250 milliseconds of FIG. 19.

If the compression and decompression times differ from each other, a longer one is used as the compression or decompression time.

In the example, the total delay time of 200 milliseconds is within the threshold of 250 milliseconds, and therefore, a proper compression rule is selected from this route. If the total delay time exceeds the threshold, the device (route) specified by the IP address stored in the corresponding field 142 of FIG. 13 is determined to be invalid, and the flow returns to step S181 to process the next data. If the total delay time is below the threshold 201 of FIG. 19, the flow goes to step S185.

Step S185 determines a voice compression rule. This is done by subtracting the total delay time from the threshold 201 of FIG. 19 to provide the difference between them and by selecting a voice compression rule that compresses and decompresses voice data within the difference. In FIG. 13, the first device (route) has the three compression rules G.723.1, G.729, and G.728. The difference between the total delay time of 200 milliseconds and the threshold of 250 milliseconds is 50 milliseconds. For each of the compression rules, it is determined whether or not the rule's compression and decompression complete within the difference of 50 milliseconds.

G.723.1 involves a one-way delay time of 30 milliseconds, and therefore, a round-trip delay time of 60 milliseconds. Consequently, G723.1 must be rejected.

G.729 involves a one-way delay time of 10 milliseconds and a round-trip delay time of 20 milliseconds, and therefore, is acceptable.

G.728 involves a one-way delay time of 5 milliseconds and a round-trip delay time of 10 milliseconds, and therefore, is acceptable.

As a result, G.728 having a lowest compression rate is selected and it is determined that there is a valid route. The flow returns to step S181 to carry out the compression rule selecting process on the next data.

Step S186 determines whether or not there is a valid route. If there is a valid route, the flow goes to step S187, and if not, the flow ends to determine that no connection will be done.

Step S187 compares an upper bandwidth limit 202 (FIG. 19) with a bandwidth specified by the compression rule of each valid route. A route that satisfies the upper limit is selected. If there is no such route, the flow ends to carry out no connection.

Step S188 selects a route having a voice compression rule of the lowest compression rate from among the routes selected by step S187. A technique used in step S185 to determine a voice compression rule will be explained in detail with reference to FIG. 18.

Step S191 calculates a delay time. If a device (route) has a response delay time of 240 milliseconds, a one-way delay time is 120 milliseconds. If this device has a device delay time of 70 milliseconds, the device has a total delay time of 190 milliseconds (=120+70).

Step S192 compares the total delay time with the threshold of 250 milliseconds (FIG. 19). If the total delay time is below the threshold, the flow goes to step S193, and if not, the flow ends to determine that there is no rule to determine.

Step S193 subtracts the total delay time of 190 milliseconds from the threshold of 250 milliseconds. The difference is 60 milliseconds. This value is an allowable delay time for compression and decompression, and therefore, is halved to provide a compression/decompression allowance of 30 milliseconds.

This compression/decompression allowance is compared with the delay time of each compression rule of Table 1 to select a compression rule that falls within the compression/decompression allowance. If there is no rule that secures the allowance, the flow ends to determine that there is no compression rule to determine.

As explained above, the present invention measures a network delay time in real time in response to a connection request and uses it with a compression delay time and a device delay time to select an optimum route whose delay time is allowable for the connection request.

To transmit voice signals, the present invention is capable of selecting a route involving a compression rule that secures an allowable delay time and has a low compression rate to ensue good quality of the voice signals.

What is claimed is:

1. A method of selecting a route for transmitting voice through gateways connected to the Internet, comprising the steps of:

multicasting a connection request from a caller gateway to receiver gateways along routes that run through the caller and receiver gateways and receiving at the caller gateway responses to the connection request from the receiver gateways;

finding a network delay time and a device delay time of each of the receiver gateways according to the responses;

calculating the sum of the network delay time and device delay time of each receiver gateway;

calculating, at the caller gateway, a compression/decompression allowance of each route of the receiver gateways by subtracting the calculated sum from a preset allowable delay time; and selecting one of the routes that employs a compression rule whose compression or decompression time is shorter than the corresponding compression/decompression allowance.

2. The method of claim 1, including the step of:

selecting one of the routes that employs a compression rule whose compression or decompression time is shorter than the corresponding compression/decompression allowance and provides the best transmission quality.

3. The method of claim 1, including the steps of:

calculating a maximum delay time of each of the routes according to the responses; and carrying out no connection if none of the maximum delay times is below a threshold.

4. The method of claim 1, including the step of:

selecting one of the routes that employs a compression rule whose compression or decompression time is shorter than the corresponding compression/ decompression allowance and provides the best transmission quality.

5. The method of claim 1, including the steps of:

calculating a maximum delay time of each of the routes according to the responses; and carrying out no connection if none of the maximum delay times is below a threshold.

6. A gateway apparatus selecting a route for transmitting voice through gateways connected an IP network, comprising:

means for multicasting a connection request to receiver gateways along routes running through the receiver gateways;

means for receiving responses to the connection request from the receiver gateways;

means for finding a network delay time and a device delay time of each of the receiver gateways according to the responses, calculating the sum of the network delay time and device delay time of each receiver gateway, and calculating a compression or decompression allowance time of each route of the receiver gateways by subtracting the calculated sum from a preset allowable delay time; and means for selecting one of the routes that employs a compression rule whose compression or decompression time is shorter than the calculated compression or decompression allowance time of the corresponding receiver gateway.

7. The apparatus of claim 6, wherein no connection is carried out if there is no receiver gateway whose sum of the network delay time, device delay time, and compression or decompression time is below a threshold.

8. The apparatus of claim 6, wherein a route that employs a compression rule whose compression or decompression time is shorter than the calculated compression or decompression time of the corresponding receiver gateway, and provides the best transmission quality, is selected.

* * * * *